United States Patent
Langemann

(10) Patent No.: US 6,848,218 B2
(45) Date of Patent: Feb. 1, 2005

(54) WINDOW SEALING STRIP FOR A CONVERTIBLE

(75) Inventor: Uwe Langemann, Salzgitter (DE)

(73) Assignee: Meteor Gummiwerke K.H. Bädje GmbH & Co., Bockenem (DE)

( * ) Notice: Subject to any disclaimer, the term of this patent is extended or adjusted under 35 U.S.C. 154(b) by 1 day.

(21) Appl. No.: 10/380,719

(22) PCT Filed: Mar. 22, 2002

(86) PCT No.: PCT/EP02/03206
§ 371 (c)(1),
(2), (4) Date: Mar. 18, 2003

(87) PCT Pub. No.: WO03/011623
PCT Pub. Date: Feb. 13, 2003

(65) Prior Publication Data
US 2004/0010976 A1 Jan. 22, 2004

(30) Foreign Application Priority Data
Jul. 19, 2001 (DE) .......................... 201 11 998

(51) Int. Cl.$^7$ .............................. E06B 7/16; B60J 10/08
(52) U.S. Cl. ................... 49/495.1; 49/489.1; 296/146.9
(58) Field of Search ................... 49/502, 495.1, 49/490.1, 489.1, 492.1, 475.1, 481, 480; 296/146.9, 146.1, 146.16, 146.15, 210, 93; 277/902; 52/204.56

(56) References Cited
U.S. PATENT DOCUMENTS 3,939,608 A * 2/1976 Asakai et al. .............. 49/493.1
4,047,751 A * 9/1977 Koike ...................... 296/146.9
4,266,824 A * 5/1981 Inamoto .................... 296/210
4,284,304 A * 8/1981 Nakamura .................. 296/201
4,678,696 A * 7/1987 Maeno et al. ............... 428/122
5,369,914 A * 12/1994 Takeuchi ................... 49/495.1
5,527,583 A * 6/1996 Nozaki et al. ................ 428/99
5,601,329 A 2/1997 Glagow et al. ........ 296/146.14
5,791,722 A * 8/1998 Nozaki et al. ........... 296/146.9
6,030,022 A * 2/2000 Bormann et al. ...... 296/107.04
6,260,906 B1 * 7/2001 Buchholz ................. 296/146.9

FOREIGN PATENT DOCUMENTS

| DE | 43 14 191 C1 | 8/1994 | ........... B29C/47/06 |
| DE | 197 14 642 A1 | 10/1998 | ........... B60J/10/04 |
| DE | 199 28 724 A1 | 1/2001 | ........... B60J/10/04 |
| EP | 0 618 101 A2 | 2/1994 | ........... B60J/10/02 |
| WO | WO 01/21425 A1 | 3/2001 | ........... B60J/10/00 |
| WO | WO 01/21426 A1 | 3/2001 | ........... B60J/10/10 |

* cited by examiner

Primary Examiner—Hugh B. Thompson, II
(74) Attorney, Agent, or Firm—Synnestvedt & Lechner LLP

(57) ABSTRACT

A profiled seal for sealing a side window that can be raised and lowered relatively to a roof frame of an automobile is disclosed. The seal includes a support rail co-extruded with an elongated elastomeric strip. Retaining elements are attached to the support rail and are positioned in spaced relation to one another. The retaining elements have slotted bases and are attached to the support rail using rivets received within the slots. The slots are oriented lengthwise parallel to the support rail and allow the retaining elements to be positionally adjusted. The retaining elements project outwardly from the support rail and are adapted to engage the roof frame for attachment of the profiled seal thereto.

12 Claims, 3 Drawing Sheets

WINDOW SEALING STRIP FOR A CONVERTIBLE

This application is a national stage entry of International Application No. PCT/EP02/03206, filed Mar. 22, 2002.

FIELD OF THE INVENTION

The invention relates to a profiled seal for sealing a side window pane which can be raised and lowered relative to a roof frame of a convertible.

BACKGROUND OF THE INVENTION

In a known profiled seal of this type (described in International Patent Application WO 01/21425 A1 in the name of the present applicant) a metal support rail is used, with which the retaining elements are constructed in one piece. The material of the support rail disposed adjacent to these mounting areas in the longitudinal direction must be removed in some way, e.g. stamped out. This leads to undesirable waste of the material of the support rail.

From German Patent Publication No. DE 43 14 191 C1 in the name of the present applicant it is known per se to produce a composite profile from plastics and elastomers which are chemically bonded to one another.

SUMMARY AND OBJECTS OF THE INVENTION

The object of the invention is to avoid waste from the support rail as far as possible.

This object is achieved by the use of retaining elements disposed spaced from one another in the longitudinal direction along a profiled seal having a support rail and a profiled elastomer strip. The retaining elements are produced separately and, following the co-extrusion of the support rail and the profiled elastomer strip, are subsequently fixed at desired points on the support rail. The profiled seal is fixed on connecting parts of a roof frame with fixing elements. Bending the retaining elements into a favorable position for mounting on the connecting parts simplifies the mounting of the profiled seal on the roof frame of the convertible.

Secure fixing of the retaining elements on the support rail is promoted by a base on each retaining element which bears on the support wall.

By fixing the base of each retaining element to the support rail using a rivet received in a slot in each base, the slot extending in parallel with the longitudinal direction of the support rail, a positive locking connection of the retaining elements to the support rail is produced. If need be, an adjustment may be made in the longitudinal direction before the fixing of the retaining element.

By gluing the bases of the retaining elements to the support rail, a durable fixing of the retaining element on the support rail is obtained which can be adjusted before its completion.

Alternately, each base may be attached to the support rail by welding, for example, by spot welding in the case of metal partners or by ultrasonic welding in the case of plastic partners.

To ensure reliable sealing of the profiled elastomer strip against the connecting part, the support rail may extend into a foot of the profiled elastomer strip which cooperates in a sealing manner with the connecting part.

To ensure particularly good sealing and also permit simple fixing of the retaining elements between the sealing ribs on the support rail, the foot is provided with sealing ribs in the region of long edges of the support rail. Each sealing rib extends in the longitudinal direction and cooperates in a sealing manner with the connecting part.

"Curve compatibility" of the profiled seal is improved by making lateral bending of the profiled seal easier by positioning cut-outs on at least one long edge of the support rail.

Preferably, each fixing element is constructed as a spring clip which is fixed on the retaining element and can be pushed into a receiving opening in the connecting part so as to latch there. This allows a particularly rapid and simple fixing of the profiled seal on the roof frame to be achieved. If required, this connection can be designed to be easily releasable.

The support rail may be made from plastic or sheet metal strip.

BRIEF DESCRIPTION OF THE DRAWINGS

These and further features and advantages of the invention are explained in greater detail below with reference to the embodiments illustrated in the drawings, in which.

In all the drawings the same parts are provided with the same reference numerals.

DETAILED DESCRIPTION OF THE PREFERRED EMBODIMENTS

Figure 1:
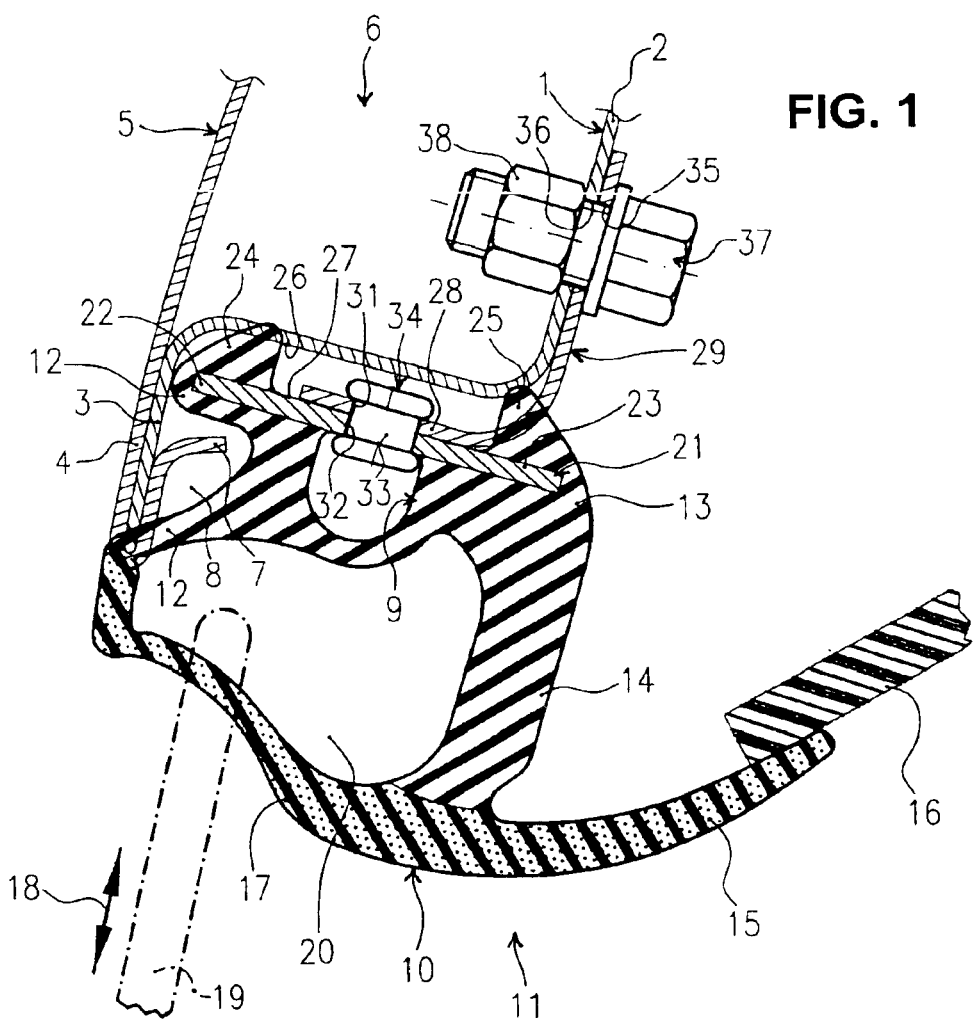
FIG. 1 shows a cross-section through the roof region of a convertible with fixed folding roof and attached profiled seal.

According to FIG. 1 a roof frame 1 of a convertible is provided with a three-dimensional connecting part 1 formed from sheet metal. The connecting part 1 could also be made, for example, from cast aluminum in accordance with the aforementioned WO 01/21425 A1. A lacquered visible outer sheet 4 of an associated roof part 5 of a folding roof 6 is beaded around a flange 3 of the connecting part 2. The outer sheet 4 has an inherently stable peripheral flange 7 which is bent inwards and engages in a longitudinal groove 8 in a foot 9 of a profiled elastomeric strip 10 of a profiled seal.

The outer sheet 4 can, for example, be glued to the flange 3. The longitudinal groove 8 is formed in a first long edge 12 of the foot 9. An arm 14 of the profiled elastomeric strip 10 extends outwards from an opposing second long edge 13 of the foot 9 at an angle of approximately 90°. A sealing lip 15 is formed on the free long edge of the arm 14 and co-operates with an inner cladding 16 of the roof part 5 to be mounted on the end. The foot 9 and the arm 14 are made from soft rubber.

A membrane 17 of the profiled elastomeric strip 10 is fixed between a free long edge of the arm 14 and the first long edge 12 of the foot 9. In this case the membrane 17 and the sealing lip 15 are made from foam rubber. The membrane 17 co-operates in a sealing manner with a side window pane 19 of the convertible which can be raised and lowered in the directions indicated by a double 18. In FIG. 1 the window pane 19 is shown by dash-dot lines in its closed end position, whilst the membrane 17 is still shown in its unloaded starting position. There is a hollow space 20 in the interior of the profiled elastomeric strip 10.

A support rail 21 which is made in this case from sheet metal is connected to the profiled elastomeric strip 10 by co-extrusion. According to FIG. 1 a part of the support rail 21 including its long edges 22 and 23 is molded into the foot 9. Sealing lips 24 and 25 made from soft rubber are formed onto the long edges 12 and 13 respectively of the foot 9 and are biased against a sealing surface 26 of the connecting part 2.

A base 28 of a retaining element 29 constructed as a bracket bears on an elastomer-free mounting surface 27 of the support rail 21. The base 28 has a longitudinal slot 31 which extends in a longitudinal direction 30 (FIG. 2) of the profiled seal 11. A bore 32 in the support rail 21 is aligned with the longitudinal slot. A shank 33 of a rivet 34 penetrates the longitudinal slot 31 and the bore 32. After the retaining element 29 has been optimally positioned relative to the support rail 21 the rivet 34 is riveted and in this way fixes the retaining element 29 permanently on the support rail 21.

On its free end which is uppermost in FIG. 1 the retaining element 29 has a bore 35 which is aligned with the bore 36 in the connecting part 2. A fixing element 37 in the form of a screw is passed through the bores 35, 36 and secured by a nut 38. In this way the profiled seal 11 is fixed in its optimal relative position on the connecting part 2.

Figure 2:
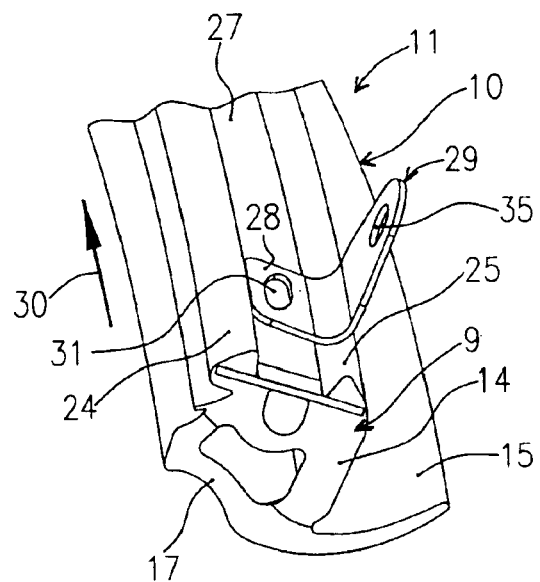
FIG. 2 shows a perspective view of a part of the profiled seal according to FIG. 1 on a smaller scale.

FIG. 2 shows principally how the retaining element 29 extends in the longitudinal direction 30. For greater clarity the rivet 34 has been omitted in FIG. 2.

Figure 3:
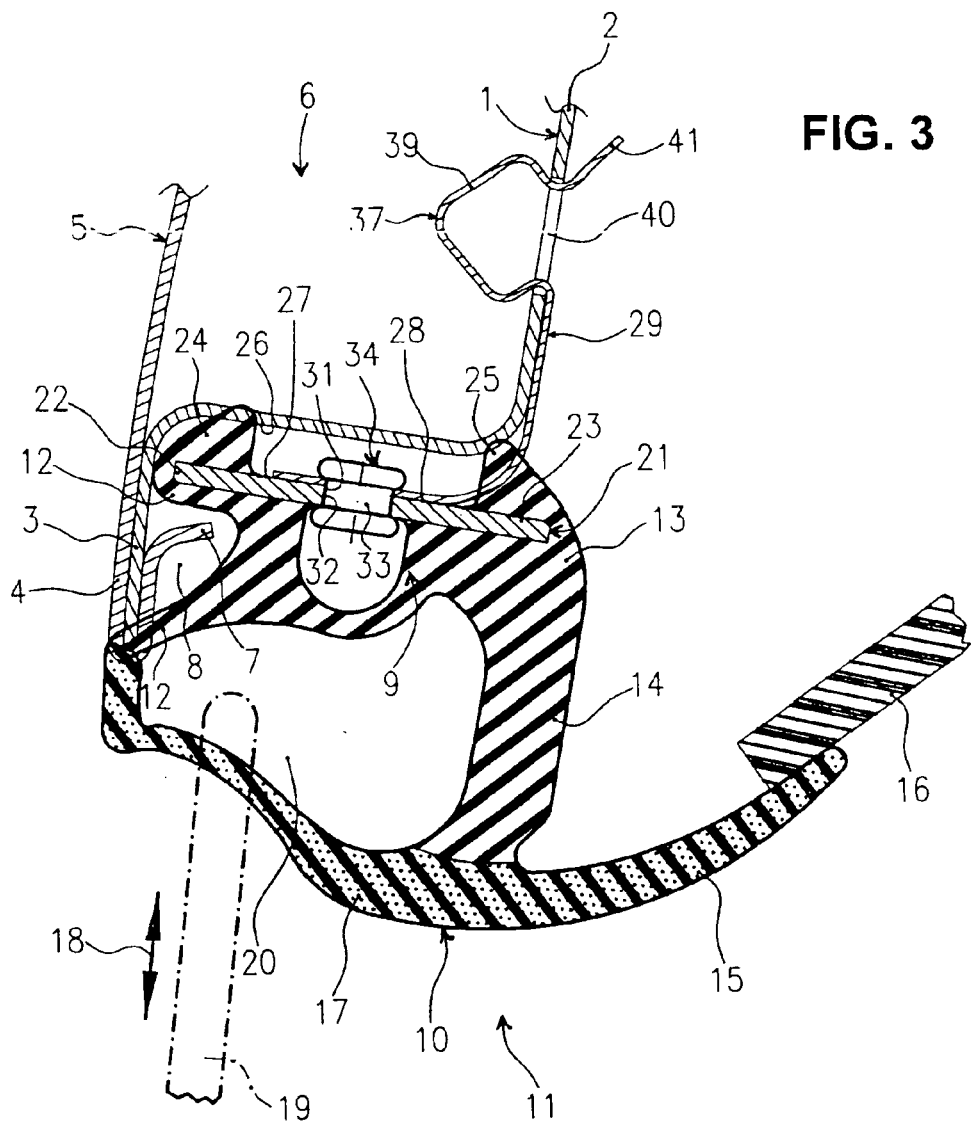
FIG. 3 shows a cross-section corresponding to FIG. 1 through another profiled seal.
Figure 4:
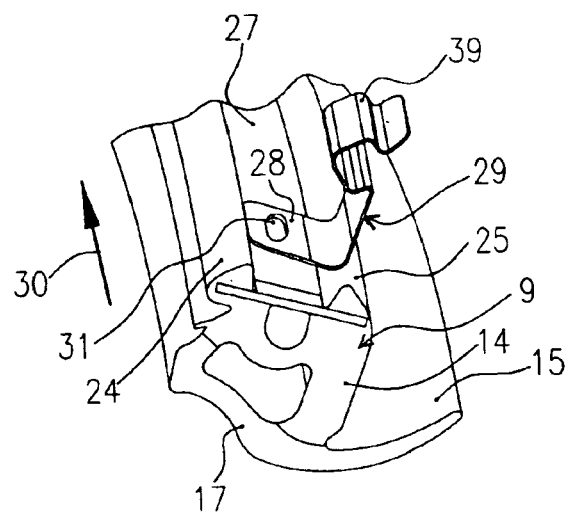
FIG. 4 shows a perspective view of the profiled seal according to FIG. 3 on a smaller scale.

The embodiment according to FIGS. 3 and 4 is the same as that according to FIGS. 1 and 2 with the exception that the retaining element 29 in the case of FIGS. 3 and 4 is produced as a whole from spring steel. The upper end of the retaining element 29 is constructed as a spring clip 39 which according to FIG. 3 is pressed into a receiving opening 40 of the connecting part 2 so as to latch there. Thus the profiled seal 11 is fixed immovably on the connecting part. However, in this case the profiled seal can also be released again from the connecting part. For this purpose in FIG. 3 a force is merely exerted downwards and towards the right on an upper tab 41 of the spring clip 39 until the spring clip 39 has left the receiving opening 40 again. In this way according to FIGS. 3 and 4 the profiled seal 11 can be very quickly replaced in the event of damage.

FIG. 4 shows how the retaining element 29 extends in the longitudinal direction 30.

Figure 5:
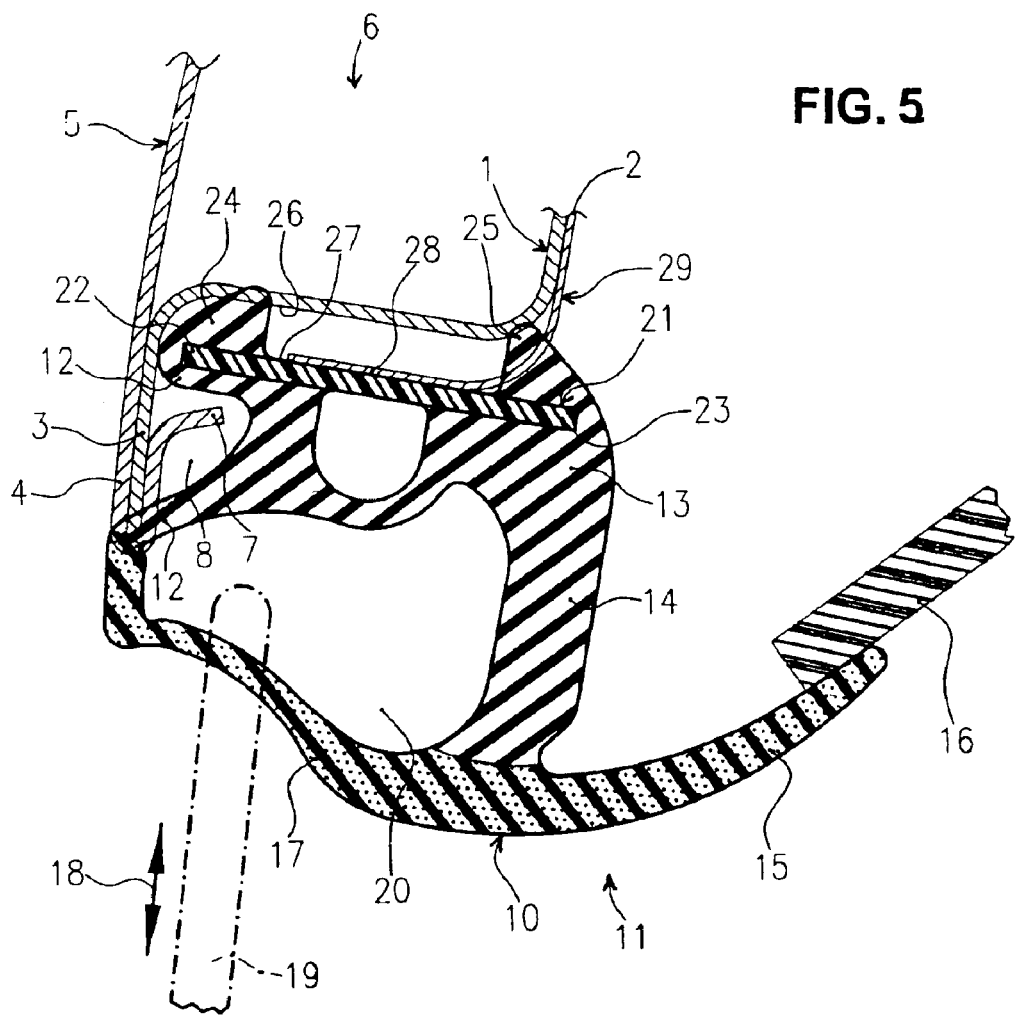
FIG. 5 shows a cross-section through yet another profiled seal.

The embodiment according to FIG. 5 differs from the previously described embodiments in that the support rail 21 is made from plastic which is co-extruded with the profiled elastomeric strip 10. This co-extrusion can be carried out in accordance with the aforementioned DE 43 14 191 C1.

In FIG. 5 the base 28 of the retaining element 29 is glued onto the mounting surface 27 of the support rail 21. If the retaining element 29 is also made from plastic, it can be durably connected to the support rail 21 in a simple manner by ultrasonic welding.

The connecting part 2 can be fixed on the roof frame 1 in any way, for example according to FIG. 1 or 3.

Figure 6:
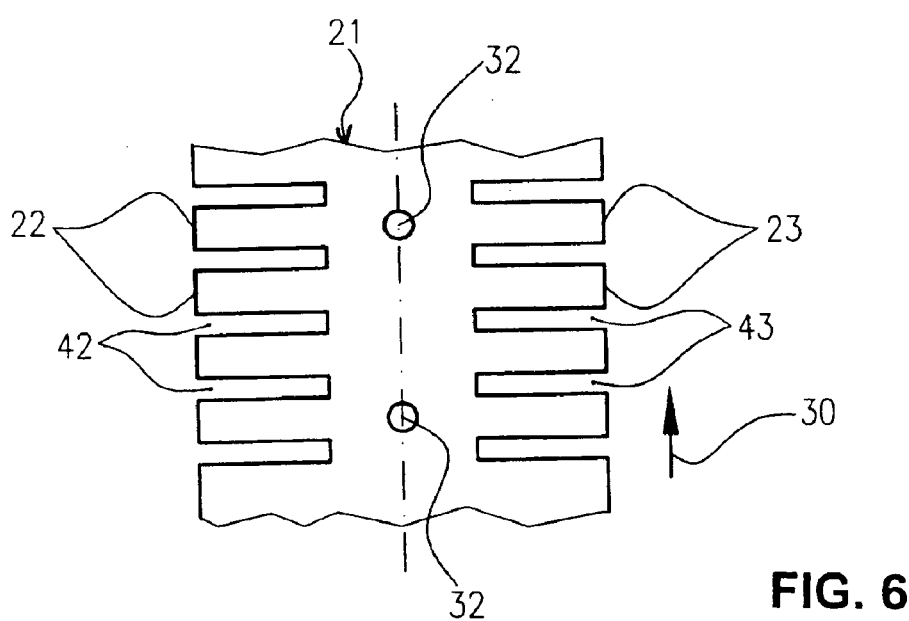
FIG. 6 shows a plan view of the support rail.

According to FIG. 6 the support rail 21 is provided on its long edges 22, 23 with cut-outs 42 and 43. As a result the support rail 21 in FIG. 6 can be bent relatively easily about an axis perpendicular to the drawing plane. This simplifies the adaptation of the three-dimensional profiled seal 11 to the installation situation on the connecting part 2. Optionally it is possible for only the cut-outs 42 or only the cut-outs 43 to be provided.

What is claimed is:

1. A profiled seal for sealing a side window that can be raised and lowered relatively to a roof frame of an automobile, said seal comprising:

an elongated elastomeric strip sealingly engageable with said side window;

an elongated support rail co-extruded with said elastomeric strip and thereby attached thereto; and a plurality of retaining elements attached to said support rail and positioned in spaced apart relation lengthwise therealong, each of said retaining elements including a base portion engaged with said support rail, each base portion having an elongated slot, a rivet being received within said slot for attachment of said retaining elements to said support rail, each said slot being oriented substantially lengthwise aligned with said support rail for lengthwise adjustment of said retaining elements therealong, said retaining elements projecting outwardly from said support rail and being adapted to engage said roof frame for attachment of said profiled seal thereto.

2. The profiled seal according to claim 1, wherein said retaining elements comprise a projecting portion attached to said base portion by a bend positioned in each of said retaining elements that adapts said retaining elements for engagement with said roof frame.

3. The profiled seal according to claim 1, wherein said elastomeric strip comprises a foot adapted to sealingly cooperates with said roof frame, said support rail extending into said foot.

4. The profiled seal according to claim 3, further comprising a pair of sealing ribs positioned on said foot for sealingly cooperating with said roof frame, said sealing ribs extending lengthwise along opposite edges of said support rail in spaced apart relation to one another.

5. The profiled seal according to claim 4, wherein said support rail comprises sheet metal.

6. The profiled seal according to claim 3, wherein said support rail comprises a sheet metal strip.

7. The profiled seal according to claim 1, wherein said support rail has lengthwise extending edges oppositely disposed, a plurality of cut-outs being positioned along said edges in spaced apart relation to each other.

8. The profiled seal according to claim 7, wherein said support rail comprises a sheet metal strip.

9. The profiled seal according to claim 1, wherein said support rail comprises a sheet metal strip.

10. The profiled seal according to claim 1, wherein said support rail comprises plastic.

11. A profiled seal for sealing a side window that can be raised and lowered relatively to a roof frame of an automobile, said seal comprising:

an elongated elastomeric strip sealingly engageable with said side window;

an elongated support rail co-extruded with said elastomeric strip and thereby attached thereto; and a plurality of retaining elements attached to said support rail and positioned in spaced apart relation lengthwise therealong, each of said retaining elements including a spring clip mounted thereon, said retaining elements projecting outwardly from said support rail and being adapted to engage said roof frame, said roof frame having a plurality of openings therein positioned in spaced relation so as to substantially align with said spring clips, said openings adapted to receive said spring clips to effect attachment of said profiled seal to said roof frame.

12. The profiled seal according to claim 11, wherein said support rail comprises a sheet metal strip.

* * * * *

UNITED STATES PATENT AND TRADEMARK OFFICE
CERTIFICATE OF CORRECTION

PATENT NO. : 6,848,218 B2
DATED : February 1, 2005
INVENTOR(S) : Uwe Langemann

It is certified that error appears in the above-identified patent and that said Letters Patent is hereby corrected as shown below:

<u>Column 4,</u>
Line 33, "cooperates" should be -- cooperate --.

Signed and Sealed this

Seventeenth Day of May, 2005

JON W. DUDAS
*Director of the United States Patent and Trademark Office*